UNITED STATES PATENT OFFICE.

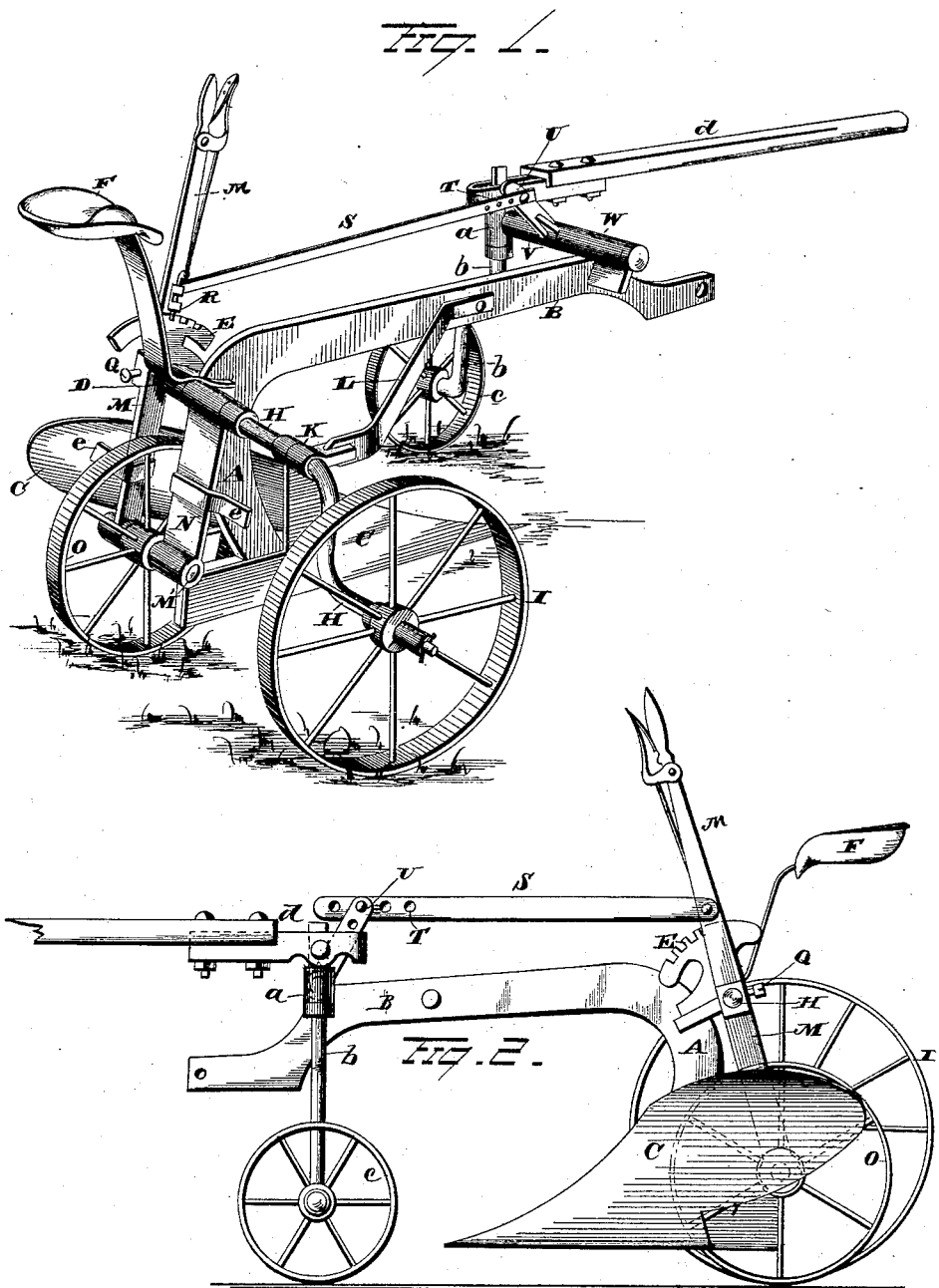

WILLIAM NEWLIN, OF ATTICA, ASSIGNOR OF ONE-HALF TO JAMES S. WARWICK, OF LAFAYETTE, INDIANA.

WHEEL-PLOW.

SPECIFICATION forming part of Letters Patent No. 318,283, dated May 19, 1885.

Application filed February 28, 1885. (No model.)

*To all whom it may concern:*

Be it known that I, WILLIAM NEWLIN, of Attica, in the county of Fountain and State of Indiana, have invented certain new and useful Improvements in Wheel-Plows; and I do hereby declare the following to be a full, clear, and exact description of the invention, such as will enable others skilled in the art to which it appertains to make and use the same.

My invention relates to an improvement in wheel-plows, the object of the same being to provide means whereby the furrow-wheels may be simultaneously elevated or lowered, and at the same time raising and depressing the plowshare. A further object is to provide a plow of the above character which shall be simple and economical in construction and durable and efficient in use; and with these ends in view my invention consists in the certain features of construction and combinations of parts, as will be hereinafter fully described, and pointed out in the claims.

In the accompanying drawings, Figure 1 is a view in perspective of my improvement, and Fig. 2 is a view thereof in side elevation.

A represents the standard, and B the plow-beam, to which is suitably secured the plow C. To the rear of the beam and standard is rigidly secured or formed integral the sleeve D, provided on one side with the sector-bar E. A seat, F, is rigidly secured to the said sleeve and beam, as shown. In the sleeve D is journaled one end of the cranked axle H, carrying the land-wheel I, the opposite end of said axle being journaled in the sleeve K, formed on one end of the brace L, the opposite end of which is rigidly secured to the beam.

To one end of the axle H is secured the lever M, in the lower end of which is journaled one end of the axle M', on which is journaled the furrow-wheel O, the opposite end of the said axle being journaled in the lower end of the depending arm-support N, which is sleeved on the said axle H. The lever M is rigidly secured to the axle H by means of a set-screw, Q, the object of which is to permit the adjustment of the land-wheel I relatively to the furrow-wheel, as desired. The lever M is provided at its upper end with a suitable handle and a spring-actuated dog, R, of ordinary construction, adapted to register with the sector-bar E, and thus retain the parts in rotary adjustment.

To the lever P is pivoted the connecting-rod S, the forward end of which is provided with two or more holes, T, by means of which the same is adjustably pivoted to the vertical arm U, rigidly attached to the arm V, which is journaled in the sleeve W, formed or secured on the forward end of the beam. The upper end of the arm U is also provided with two or more perforations for permitting the vertical adjustment of the rod S thereon. The outer end of the arm V is provided with the vertical sleeve $a$, in which is journaled the upper end of the cranked stub-axle $b$, which supports the forward furrow-wheel, $c$. To the upper end of the said axle $b$ is pivoted the tongue $d$, as shown.

To the lever M and the support N are rigidly secured the foot-rests $e$. When it is desired to elevate the plow, the upper portion of lever M is forced backward and the wheels retain their relative position to each other. A particular advantage gained by placing the foot-rests upon the supports M and N consists in the fact that as they are below the pivotal point of the lever M, when the plow is to be elevated, by exerting pressure upon the foot-rest, the rear wheels are forced forward, thus assisting the power exerted upon the lever M.

When it is desirable to elevate the forward furrow-wheel—as, for instance, when the land has not been broken—the rod S may be lengthened, thus allowing the forward furrow-wheel to swing toward the rear and upwardly, whereby the same will be enabled to run upon the surface of the land. When the land has been broken and a furrow made, the position of the parts may be changed accordingly.

It is evident that slight changes and alterations might be made in the construction and relative arrangement of parts other than those described; hence I would have it understood that I do not limit myself to the exact construction shown and described, but consider myself at liberty to make such changes and alterations as properly fall within the spirit and scope of my invention.

Having fully described my invention, what I claim as new, and desire to secure by Letters Patent, is—

1. In a wheel-plow, the combination, with a front furrow-wheel, a lever, and a rear furrow-wheel journaled on an axle secured to the lower end of said lever, of a rod connecting the lever and front furrow-wheel, whereby they are simultaneously elevated and depressed, substantially as set forth.

2. In a wheel-plow, the combination, with the plow-frame and the land-wheel axle, of a lever journaled on said axle, a rear furrow-wheel journaled in the lower end of said lever, and means for locking the lever in rotary adjustment, and thereby determining the elevation of the furrow-wheel relatively to the frame, substantially as set forth.

3. The combination, with the plow-frame and the land-wheel axle journaled therein, of a lever fulcrumed on said axle, a rear furrow-wheel journaled in the lower end of said lever, a front wheel secured to the beam in rocking adjustment, and devices connecting the lever and front furrow-wheel, whereby the front and rear furrow-wheels are simultaneously elevated or depressed relatively to the frame, substantially as set forth.

4. The combination, with the frame and the land-wheel axle journaled therein, of a lever carrying the rear furrow-wheel in its lower end and secured in rotary adjustment on the land-wheel axle, whereby the positions of the land-wheel and furrow-wheel relatively to each other and to the frame may be changed, substantially as set forth.

5. The combination, with a front furrow-wheel axle journaled in the bearings secured to the plow-beam and provided with an upwardly-extending arm, and a rear furrow-wheel secured in the lower end of the lever fulcrumed on the land-wheel axle, of a rod connecting the said arm and lever, whereby the two furrow-wheels are operated simultaneously, substantially as set forth.

6. In a plow, the combination, with the frame and the land-wheel axle journaled therein, of a lever and support fulcrumed on said axle, a rear furrow-wheel journaled in the lower end of said lever and support, foot-rests secured on the supports on opposite sides of the wheel, whereby the weight of the driver will assist the lever in throwing the furrow-wheels forward, substantially as set forth.

In testimony whereof I have signed this specification in presence of two subscribing witnesses.

WILLIAM NEWLIN.

Witnesses:
WILL B. REED,
ARTHUR L. SARGEANT.